(12) United States Patent
Karaoguz et al.

(10) Patent No.: US 8,799,366 B2
(45) Date of Patent: Aug. 5, 2014

(54) MIGRATION OF STORED MEDIA THROUGH A MEDIA EXCHANGE NETWORK

(75) Inventors: Jeyhan Karaoguz, Irvine, CA (US); James Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1399 days.

(21) Appl. No.: 10/675,654

(22) Filed: Sep. 30, 2003

(65) Prior Publication Data

US 2004/0117429 A1 Jun. 17, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003, provisional application No. 60/444,243, filed on Jan. 30, 2003.

(51) Int. Cl.

| G06F 15/173 | (2006.01) |
| --- | --- |
| H04N 7/18 | (2006.01) |
| H04N 21/262 | (2011.01) |
| H04N 21/63 | (2011.01) |
| H04N 21/2343 | (2011.01) |
| H04N 7/14 | (2006.01) |
| H04N 21/658 | (2011.01) |
| H04N 21/482 | (2011.01) |
| H04N 21/475 | (2011.01) |
| H04N 21/254 | (2011.01) |
| H04N 21/4786 | (2011.01) |
| H04L 29/08 | (2006.01) |
| H04N 21/2668 | (2011.01) |
| H04N 21/4227 | (2011.01) |
| H04N 21/2543 | (2011.01) |
| H04N 21/4627 | (2011.01) |
| H04N 21/462 | (2011.01) |
| H04N 21/4788 | (2011.01) |
| H04N 21/6583 | (2011.01) |
| H04N 21/472 | (2011.01) |
| H04N 21/258 | (2011.01) |
| H04N 21/458 | (2011.01) |
| H04N 21/426 | (2011.01) |
| H04N 21/4143 | (2011.01) |
| H04N 21/24 | (2011.01) |
| H04N 21/81 | (2011.01) |
| H04N 21/488 | (2011.01) |
| H04N 21/4363 | (2011.01) |
| H04L 29/06 | (2006.01) |
| H04N 21/466 | (2011.01) |
| H04N 7/173 | (2011.01) |

(52) U.S. Cl.
CPC ....... *H04N 21/26266* (2013.01); *H04N 21/632* (2013.01); *H04N 11/44222* (2013.01); *H04N 21/234363* (2013.01); *H04N 7/18* (2013.01); *H04N 7/147* (2013.01); *H04N 21/6581* (2013.01); *H04N 21/4826* (2013.01); *H04N 21/4751* (2013.01); *H04N 21/254* (2013.01); *H04N 21/482* (2013.01); *H04N 21/4786* (2013.01); *H04L 67/325* (2013.01); *H04N 21/2668* (2013.01); *H04N 21/4227* (2013.01); *H04N 21/2543* (2013.01); *H04N 21/4627* (2013.01); *H04N 21/4622* (2013.01); *H04N 21/4788* (2013.01); *H04N 21/6583* (2013.01); *H04N 21/47214* (2013.01); *H04N 21/25833* (2013.01); *H04N 21/458* (2013.01); *H04L 67/06* (2013.01); *H04N 21/42684* (2013.01); *H04N 21/4143* (2013.01); *H04N 21/2408* (2013.01); *H04N 21/2343* (2013.01); *H04N 21/812* (2013.01); *H04N 21/4882* (2013.01); *H04N 21/4755* (2013.01); *H04N 7/141* (2013.01); *H04N 21/43637* (2013.01); *H04L 65/4084* (2013.01); *H04N 21/4668* (2013.01); *H04N 7/17309* (2013.01)
USPC ................ 709/205; 725/86; 725/101; 725/74

(58) Field of Classification Search
USPC ......... 709/217, 227, 228, 229, 230, 231, 232, 709/233, 234, 238; 725/105–142; 348/113–115; 370/229–238, 395.2, 370/395.21
See application file for complete search history.

(56) References Cited

U.S. PATENT DOCUMENTS

| | | | |
|---|---|---|---|
| 5,526,358 A * | 6/1996 | Gregerson et al. | 709/221 |
| 6,774,926 B1 | 8/2004 | Ellis et al. | |
| 2002/0002614 A1* | 1/2002 | Murphy et al. | 709/226 |
| 2002/0016971 A1 | 2/2002 | Berezowski et al. | |
| 2002/0194309 A1* | 12/2002 | Carter et al. | 709/219 |
| 2004/0003051 A1 | 1/2004 | Krzyzanowski et al. | |
| 2005/0028208 A1 | 2/2005 | Ellis et al. | |

OTHER PUBLICATIONS

"The Gnutella Protocol Specification v0.4", posted on www.clip2.com/GnutellaProtocol04.pdf on Jun. 3, 2001.*

* cited by examiner

*Primary Examiner* — Scott Christensen

(74) *Attorney, Agent, or Firm* — Garlick & Markison; Bruce E. Stuckman

(57) ABSTRACT

Aspects of the invention provide a method and system for communicating information in a distributed media network. The communication of information in a distributed media network may include detecting availability of new media, data and/or service and migrating the newly available media, data and/or service to at least a first media processing system within the distributed media network. The migrated media, data and/or service may be stored at a first media processing system. If the stored media, data and/or service is to be processed, then the media, data and/or service may be migrated to a media view and/or a channel view associated with a media processing system. If the newly available migrated media, data and/or service is to be pushed, then the migrated media, data and/or service may be pushed to a second media processing system and/or a personal computer coupled to the media exchange network.

22 Claims, 12 Drawing Sheets

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | | Normal Estimated Delivery Time: 2 hrs 13 min Cost: 59c (without Queuing) | | Showing All Day (48 Min), Earliest Order Time: 4:00PM MPEG-2 1.5 Mbps | |
| VACATION in ALASKA VIDEO 803 | | Express Estimated Delivery Time: 18 min Cost: $1.2 (with Queuing) | | Showing All Day (48 Min), Earliest Order Time: 4:00PM MPEG-2 4 Mbps | |
| VACATION in ALASKA VIDEO 804 | | Overnight Delivery: Avail. Nxt Morning Cost: 5c (Server Stored) | | Showing All Day (48 Min), Earliest Order Time: 4:00PM MPEG-2 19 Mbps | |

Fig. 8

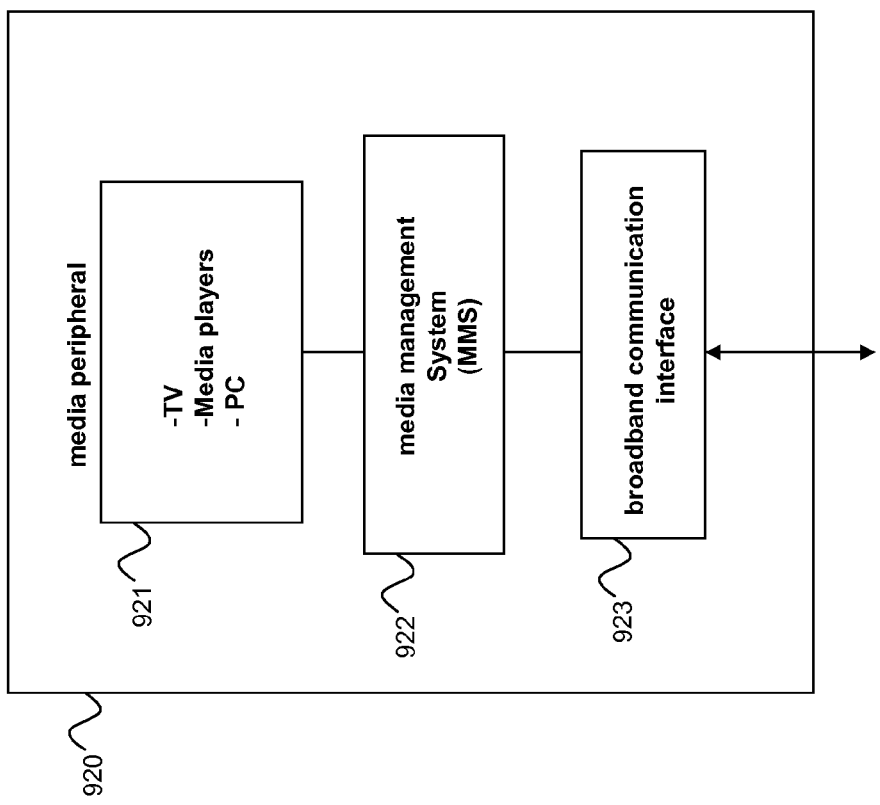

MIGRATION OF STORED MEDIA THROUGH A MEDIA EXCHANGE NETWORK

CROSS-REFERENCE TO RELATED APPLICATIONS/INCORPORATION BY REFERENCE

This application makes reference to, claims priority to, and claims the benefit of:
U.S. Provisional Application Ser. No. 60/432,472 filed Dec. 11, 2002;
U.S. Provisional Application Ser. No. 60/443,894 filed Jan. 30, 2003;
U.S. Provisional Application Ser. No. 60/457,179 filed Mar. 25, 2003; and
U.S. Provisional Application Ser. No. 60/444,243 filed Jan. 30, 2003.

This application also makes reference to:
U.S. application Ser. No. 10/657,390 filed Sep. 8, 2003; and
U.S. application Ser. No. 10/660,267 filed Sep. 11, 2003.

All of the above stated applications are incorporated herein by reference in their entirety.

FIELD OF THE INVENTION

Certain embodiments of the invention relate to information transfer and storage in a distributed media network. More specifically, certain embodiments of the invention relate to migration of media, data and/or services through a media processing system.

BACKGROUND OF THE INVENTION

A personal computer (PC) is often used to send email messages and attached files over the Internet to other PC's. The attached files may include many types of digital format files for example, text files, PDF files, MP3 files, JPEG files, MPEG files, and TIFF files. Various PC network configurations such as a local area network (LAN) or a wide area network (WAN) may be used to transfer or migrate media from one PC to another.

Typically, media and data are transferred from a first PC to a server or through multiple servers to a second PC or to multiple PC's. Also, in various PC network configurations, media and data may be migrated directly between one PC and another, between a PC and a server, or between a server and archival storage, for example. As a result, a user is able to distribute media and data in a PC-based environment.

A PC is often used to access media stored on a media peripheral via a wired link. The accessing of media stored on such media peripherals involves the: (1) exchange of media meta information, e.g., media file names, sizes, dates, resolution and format; (2) uploading of media to the media peripheral; or (3) downloading of media from the media peripheral. As a result, a user is able to extract media for printing, routing, or processing or load media for playback or review. Even so, the overall process for doing so is a manual process that may require significant user interaction.

For example, in the case of using a PDA (personal digital assistant), a user may currently have a calendar of appointments stored on the PDA. In order to download the calendar to a PC, the user: (1) removes the PDA from its case; (2) attaches a cable between the PC and the PDA; (3) powers up the PDA; (4) places the PDA in a download mode; (5) runs a PC application that copies the calendar file from the PDA to the PC via the cable; (6) powers down the PDA; (7) removes the cable; (8) places the PDA into its case; (9) and exits the PC application. Such a process is very tedious and time consuming, and, especially when problems arise, requires a fairly savvy user.

Also, media and data may be uploaded from a PC to a media peripheral in a similar manner. For example, a user may download an operating system update for his PDA (personal digital assistant) from the Internet to his PC. The user may then follow a process, similar to the reverse of the process described above, to download the operating system update to his PDA.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for communication of information in a distributed media network. The method for communicating information in a distributed media network may include detecting availability of new media, data and/or service within the distributed network. The newly available media, data and/or service may be migrated to at least a first media processing system within the distributed media network. The migrated media, data and/or service may be stored at a first media processing system. If the stored media, data and/or service is to be processed, then the media, data and/or service may be migrated to a media view and/or a channel view associated with a media processing system. If the newly available migrated media, data and/or service is to be pushed, the migrated media, data and/or service may be pushed to a second media processing system and/or a personal computer coupled to the media exchange network.

The newly available media, data and/or service may be automatically migrated to a first and/or second media processing system within the distributed media network. This migration may occur in any one of an automatic manner, a manual manner or a combination thereof. In another aspect of the invention, migration of the media, data and/or service may also be scheduled to occur at predefined intervals and/or instants. The newly available media, data and/or service may be indicated to the first media processing system and/or the second media processing system within the distributed media network. The newly available media, data and/or service may be archived for subsequent retrieval.

Another embodiment of the invention may provide a machine-readable storage, having stored thereon, a computer program having at least one code section for providing communication of information in a distributed media network according to the step as described above.

Aspects of the invention also include a system for communicating information in a distributed media network. The system may include at least one processor utilized to detect availability of new media, data and/or service within the distributed network. The processor may migrate and store the newly available media, data and/or service to a first media processing system within the distributed media network. If the stored media, data and/or service is to be processed, then the processor may migrate the media, data and/or service to a media view and/or a channel view associated with the media processing system. If the newly available migrated media, data and/or service is to be pushed, the processor may push the media, data and/or service to a second media processing system and/or a personal computer coupled to the media exchange network.

The processor may automatically, manually or semi-automatically migrate the newly available media, data and/or service to the first and/or second media processing system within the distributed media network. Additionally, the processor may be programmed to schedule various aspects of the migration of the newly available media, data and/or service. The newly available media, data and/or service may be indicated to the first media processing system and/or the second media processing system and/or a personal computer within the distributed media network. After migration, the newly available media, data and/or service, may be archived for subsequent retrieval.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a media guide user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Aspects of the invention provide a method and system for communicating information in a distributed media network. The communication of information in a distributed media network may include detecting availability of new media, data and/or service and migrating the newly available media, data and/or service to at least a first media processing system within the distributed media network. The migrated media, data and/or service may be stored at a first media processing system. If the stored media, data and/or service is to be processed, then the media, data and/or service may be migrated to a media view and/or a channel view associated with a media processing system. If the newly available migrated media, data and/or service is to be pushed, then the migrated media, data and/or service may be pushed to a second media processing system and/or a personal computer coupled to the media exchange network.

The newly available media, data and/or service may be automatically migrated to a first and/or second media processing system within the distributed media network. This migration may occur automatically, manually or semi-automatically. Additionally, migration may be scheduled to occur at pre-specified instances and/or time intervals. The newly available media, data and/or service may be indicated to the first media processing system and/or the second media processing system within the distributed media network. The newly available media, data and/or service may be archived for subsequent retrieval.

Figure 1:
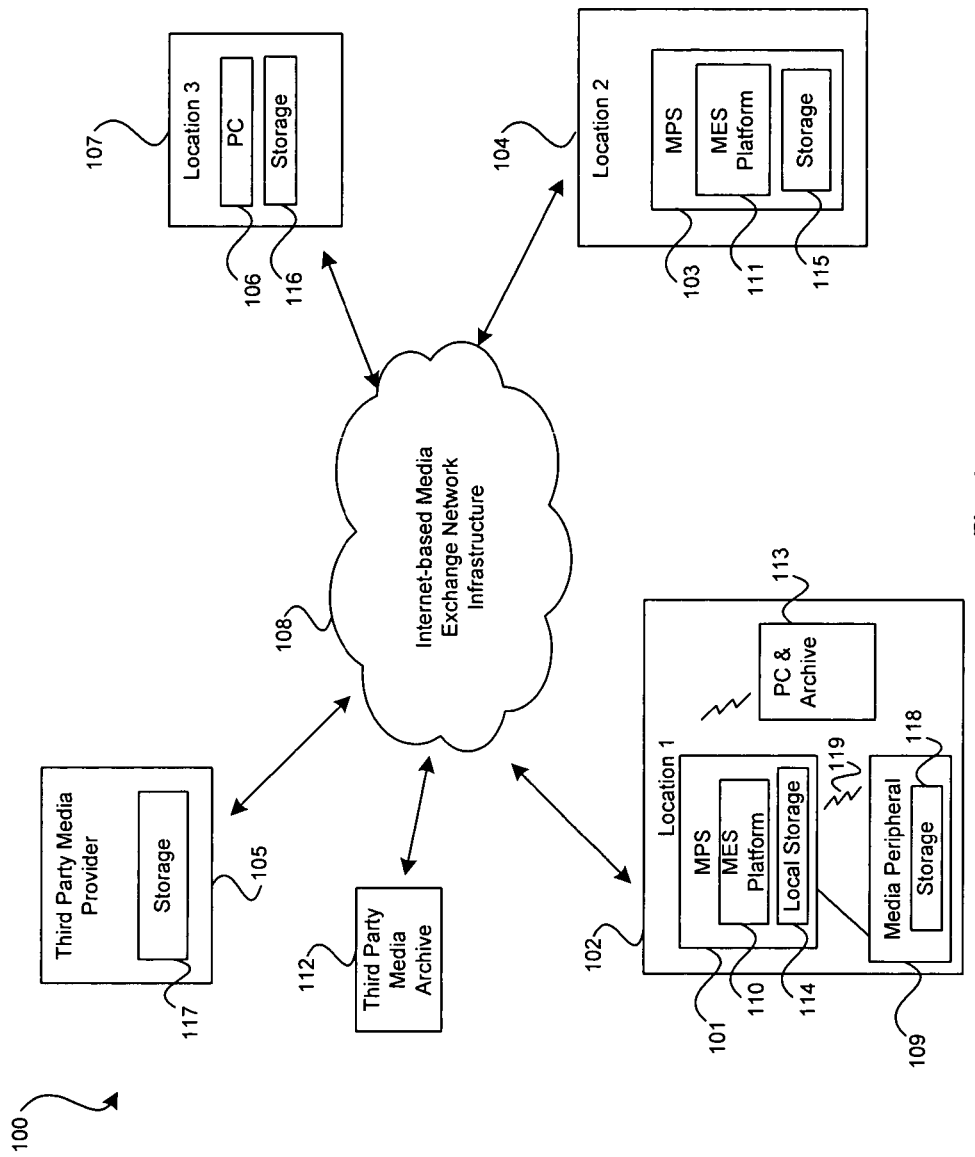
FIG. 1 is a diagram illustrating an embodiment of an exemplary media exchange network supporting the migration of media, data, and/or services in accordance with various aspects of the invention.

FIG. 1 is a diagram illustrating an embodiment of an exemplary media exchange network 100 supporting the migration of media, data, and/or services in accordance with various aspects of the invention. Specifically, a media exchange network 100 may be a communication network, which may include a first media processing system (MPS) 101 situated at a first location of the media exchange network 100, and a second MPS 103 situated at a second location 104. The media exchange network 100 may also include a third (3rd) party media provider 105, a PC 106 situated at a third location 107, and an Internet-based media exchange network infrastructure 108. Also included is a third (3rd) party media archive 112 and a third (3rd) party media provider 105. For illustrative purposes, the first location may be a user's or subscriber's home, the second location may be a family members home, and the third location may be a friend's home. Notwithstanding, any one or more of the first, second and/or third locations may be a business or office location.

The home MPS 101, the family's MPS 103, the PC 106 and the third ($3^{rd}$) party media provider 105 may each connect to the Internet-based media exchange network infrastructure 108 to allow communication or media migration between the various components 101, 103, 105, 112 and 106. The first location 102 such as the user's or subscriber's home 102, may also include a media peripheral 109 and a home PC and archive 113. The media peripheral 109 and the home PC and archive 113 may interface with the home MPS 101 via a wired or wireless connection, for example. When interfacing to the home MPS 101, the media peripheral 109 and the home PC and archive 113 may be considered part of the media exchange network 100.

The MPS 101 may include a media exchange software (MES) platform 110 and the MPS 103 may include a similar MES platform 111. In general, a MES platform such as MES platform 111 may provide certain functionality within a MPS such as the ability to cause the migration of media, data, and/or services on a media exchange network. Additionally, a MES platform may provide the capability for a user or subscriber to construct a user profile and register their MPS on the media exchange network. The MES platform 111 may also provide various views to a user of a media processing system that may be displayed on a TV screen or monitor of the MPS 101, for example. In accordance with an aspect of the invention, the views may include a device view, a media view, and/or a channel view, for example.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

In accordance with an embodiment of the invention, the various components of the media exchange network may be adapted to or have the capability to store digital media and/or data. The media processing system 101 may include a local storage 114 and the MPS 103 in the second location such as the family member's home 104 may also include a storage 115. The third location such as the friend's home 107 may include a storage 116 and the third ($3^{rd}$) party media provider 105 may also include a storage 117. The third ($3^{rd}$) party media archive 112 may be a storage device located within and/or coupled to the media exchange network 100. The media peripheral 109 may also have its own storage, which may be a limited storage area 118, for example.

For illustrative purposes, the third ($3^{rd}$) party media provider 105 may include, a server storing movies in a digital video format in the storage area 117. The media peripheral 109 may include a digital camera storing pictures in a digital image format in the storage area 118. The PC 106 may store music such as MP3, WMA or WAV files in the storage area 116 at the third location 107. The MPS 103 at the third location 104 may store family photos in a digital image format in storage area 115. The third ($3^{rd}$) party media archive 112 may store a backup of at least some of the media and/or data currently stored in the local storage area 114 on the MPS 101 at the first location.

The storage areas 114 and 115 of MPS's 101 and 103 respectively, may include a main storage and/or removable storage, for example. The main storage may include, for example, hard disk drives, a DVD player, a CD player, floppy disk drives, RAM, or any combination thereof. The removable storage may include, for example, memory sticks, PCM-CIA cards, compact flash cards, SD cards, microdrives, or any combination of these. The PC's 106 and 113 may include a desktop PC, a notebook PC, a handheld computer, a PDA, a PC tablet or any computing device. Additionally, the home PC 113 may also include substantial archiving capability. However, the invention is not so limited.

The media peripheral 109 may include, for example, a digital camera, a digital camcorder, a MP3 or WMA player, a home and/or portable juke-box system, a PDA, a handheld computer, a PC tablet and a multi-media gateway device, for example. The MPS's 101, 103 may each include a TV screen or monitor for viewing a device view, a media view, a channel view, and various sub menus of each, in accordance with various embodiments of the present invention. The views may be provided by the MES platforms 110 and 111 respectively.

The Internet-based media exchange network infrastructure 108 may include, for example, cable infrastructure, satellite network infrastructure, xDSL infrastructure, Internet infrastructure, and intranet infrastructure and/or other access technology providing wide area network (WAN) connectivity and capabilities.

Figure 2:
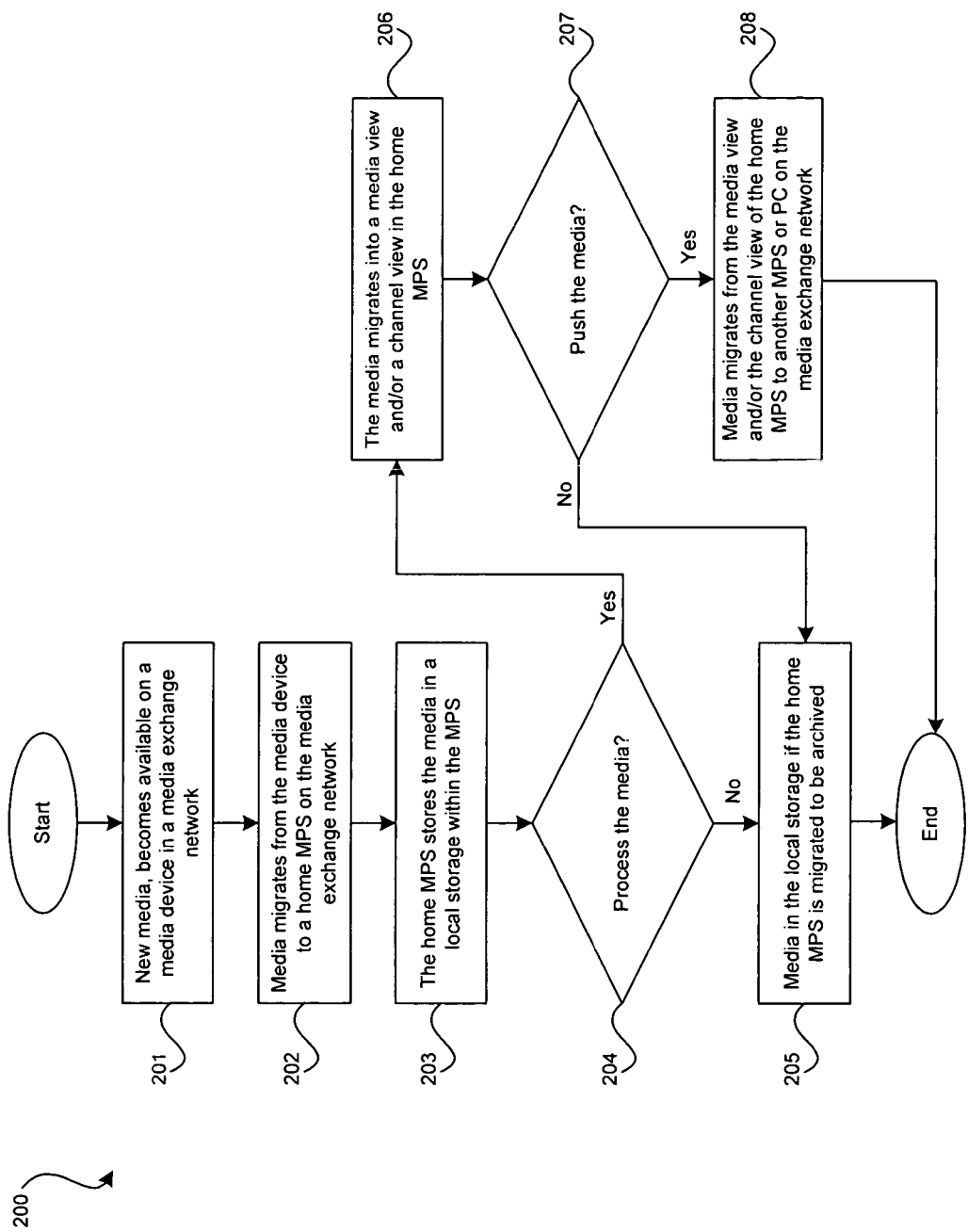
FIG. 2 is a flowchart illustrating an embodiment of a method for migrating media, data and/or services through the media exchange network of FIG. 1, in accordance with various aspects of the invention.

FIG. 2 is a flowchart illustrating an embodiment of a method 200 for migrating media, data and/or services through the media exchange network 100 of FIG. 1, in accordance with various aspects of the invention. In step 201, new media becomes available on a media device in a media exchange network. The media device may comprise, for example, a server, a media peripheral, a PC, another MPS or similar type of device coupled to and/or on the media exchange network.

In step 202, the available media migrates from the media device to a home MPS on the media exchange network. In step 203, the home MPS stores the media in a local storage area within the home MPS. In step 204, a decision may be made to process the media or not. If the media is not to be processed then, in step 205, the media in the local storage area of the home MPS may be migrated to be archived somewhere on the media exchange network.

If the media in the local storage is to be processed then, in step 206, the media is migrated to a media view or a channel view in the home MPS, for example. The media view and the channel view may be provided by the MES platform in the home MPS at the first location and may be viewed on a TV screen or monitor of the home MPS, for example. In accordance with an embodiment of the present invention, the media view may include a table of media content categories and specific media content such as individual songs, video clips, and images, for example. The channel view may include a table of channels such as personal media channels, friends' and family channels, and third (3rd) party media channels each of which may include scheduled media program content. U.S. patent application Ser. No. 10/675,382 filed Sep. 30, 2003 describes various aspects of media and channel views which are applicable to the present invention, and is incorporated herein by reference in its entirety.

In step 207, a decision may be made as to whether or not to push the media to, for example, another user on the media exchange network. If the media is not to be pushed then, in step 205, the media in the media view or channel view of the home MPS may be migrated to be archived somewhere on the media exchange network. If the media is to be pushed, then in step 208, the media migrates from the media view or channel view of the home MPS to another MPS or PC on the media exchange network.

Media, data, and services may be migrated through a media exchange network, according to the method 200, in a fully automatic manner with no user intervention, or in a semi-automatic manner with some user intervention. For example, the MPS 101 and media peripheral 109 may be configured such that, whenever new media appears in media peripheral 109 and media peripheral 109 is in range of the MPS 101, the new media may be automatically downloaded to the MPS 101 in a fully automatic manner via a wireless link 119, for example. Accordingly, no user intervention may be required. The downloaded media could show up in the media view of the MPS 101 or may just be stored in the local storage area 114 within the MPS 101. An indication may be provided to the user, the next time the user views the TV screen or monitor of his MPS, that new media has been downloaded to the MPS 101. As an alternative, new media may be downloaded from the media peripheral 109 to the MPS 101 periodically such as, for example, once a week. In this regard, a schedule may be setup to control the periodicity of downloads.

Other prompts and cues such as pop-ups and/or banners may appear on the TV screen or a monitor, and may be utilized to alert the user to other options. For example, an advertisement message could be migrated from the third (3rd) party provider 105 to the channel view of the home MPS 101 via the Internet-based media exchange network infrastructure 108. The message may be advertising a service such as, automobile detailing, to the user of the home MPS 101 based on a user profile associated with the user. When the user selects the channel in their channel view with the advertisement message, a prompt or window may pop-up on the TV screen of the home MPS 101 cueing the user to accept or reject the service. U.S. patent application Ser. No. 10/675,653 filed Sep. 30, 2003 describes various profiles which are applicable to the present invention, and is incorporated herein by reference in its entirety.

If new media is migrated to the media view of the MPS 101, the user may take action to migrate the new media from the media view to the channel view. The user may then push the channel containing the new media to someone else or another device on the media exchange network 100 such as, the MPS 103 at the second location or family member's home 104, or the PC 106 at the third location or friend's home 107. As an alternative, the MPS 101 may be configured to automatically migrate the new media from the media view to the channel view and automatically push the channel containing the new media to another user or device of the media exchange network 100. For example, a meta file may be set up to automatically or with user interaction and/or intervention, place media in a particular channel of the channel view that automatically gets pushed to a friend or family member when updated. In this regard, meta file attributes may be utilized to define this migration.

In general, in accordance with an aspect of the invention, any step of the method 200 may be performed with or without user intervention, depending on how the home MPS 101 is set up and configured on the media exchange network 100.

If the new media on the MPS 101, after a time period of, for example, two weeks, has not been processed either automatically or semi-automatically with user intervention, then the new media may be automatically archived to the home PC 113 or the third ($3^{rd}$) party media archive 112 in accordance with an embodiment of the present invention.

In another example, a user of the home MPS 101 may have a user profile set up that may indicate an interest in home schooling. The third ($3^{rd}$) party media provider 105 may store information on home schooling that may be of interest to the user of the home MPS 101. The third ($3^{rd}$) party media provider 105 may also be aware or have knowledge of the user profile of the user associated with MPS 101 at the first location 102. Alternatively, the user of the MPS 101 at the first location 102 may be aware that the third ($3^{rd}$) party media provider 105 periodically stores updates of home schooling information and may request updates to be downloaded to the MPS 101. Accordingly, these updates may be downloaded when available, on demand or at a specified instant or interval indicated by a schedule.

If new data, for example, concerning home schooling, becomes available on the third ($3^{rd}$) party media provider 105, the new data may be migrated from the $3^{rd}$ party media provider 105 to the home MPS 101 via the Internet-based media exchange network infrastructure 108. Migration may be based on the user profile and may occur automatically. The migration may also be based on a user request and may occur semi-automatically. The new data may be stored on the local storage area 114 or may be migrated to the media view or channel view of MPS 101. Again, the migration of the new data could be fully automatic or semi-automatic. In the latter case, at least some user intervention and/or interaction may be required in the exemplary steps of method 200.

If the new media to be downloaded from the $3^{rd}$ party media provider 105 is a large file or several files, it may be desirable to download the new media over a longer period of time, for example a couple days, to the home MPS 101. The extended time download of the new media may be achieved in the background, while the user may be using the home MPS 101 for other tasks. In this regard, the download may be transparent to the user. Again, the new media may be migrated to the local storage area 114, to the media view, or to the channel view, in accordance with various embodiments of the invention.

In general, various migration rules may be set up within the home MPS 101 in accordance with various embodiments of the invention. Specifically, the programming and/or storing of media may be scheduled according to various rules. Although the rules may be predefined, they may be altered on the fly and/or they may be dynamically created. For example, media that is stored in the local storage area 114 on the home MPS 101 may be periodically scheduled to be viewed by a user until the user actually views the media. A meta file in the MPS 101 may contain predefined scheduled viewing times.

As an example, if a movie from the third ($3^{rd}$) party media provider 105 was migrated to the local storage area 114 of the home MPS 101, then the movie may be automatically scheduled in the channel view of the home MPS 101 at 8:00 pm on Wednesday evening, for example, according to the migration rules in the meta file. If the user does not view the movie on or before Wednesday evening, then the movie may be automatically re-scheduled in the channel view to be viewed at 8:00 pm on Saturday evening, for example. After, for example, one week, the movie may be stored in the $3^{rd}$ party media archive 112 if the user has not viewed the movie.

In general, migration rules predefined in the home MPS 101 may define when and where media will appear in the media exchange network 100. The migration rules may take into account various aspects of operating on the media exchange network including authorization, registration, billing, cost, size of files and the likes, for example. The predefined migration rules may be overridden by user intervention, in accordance with various aspects of the present invention.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
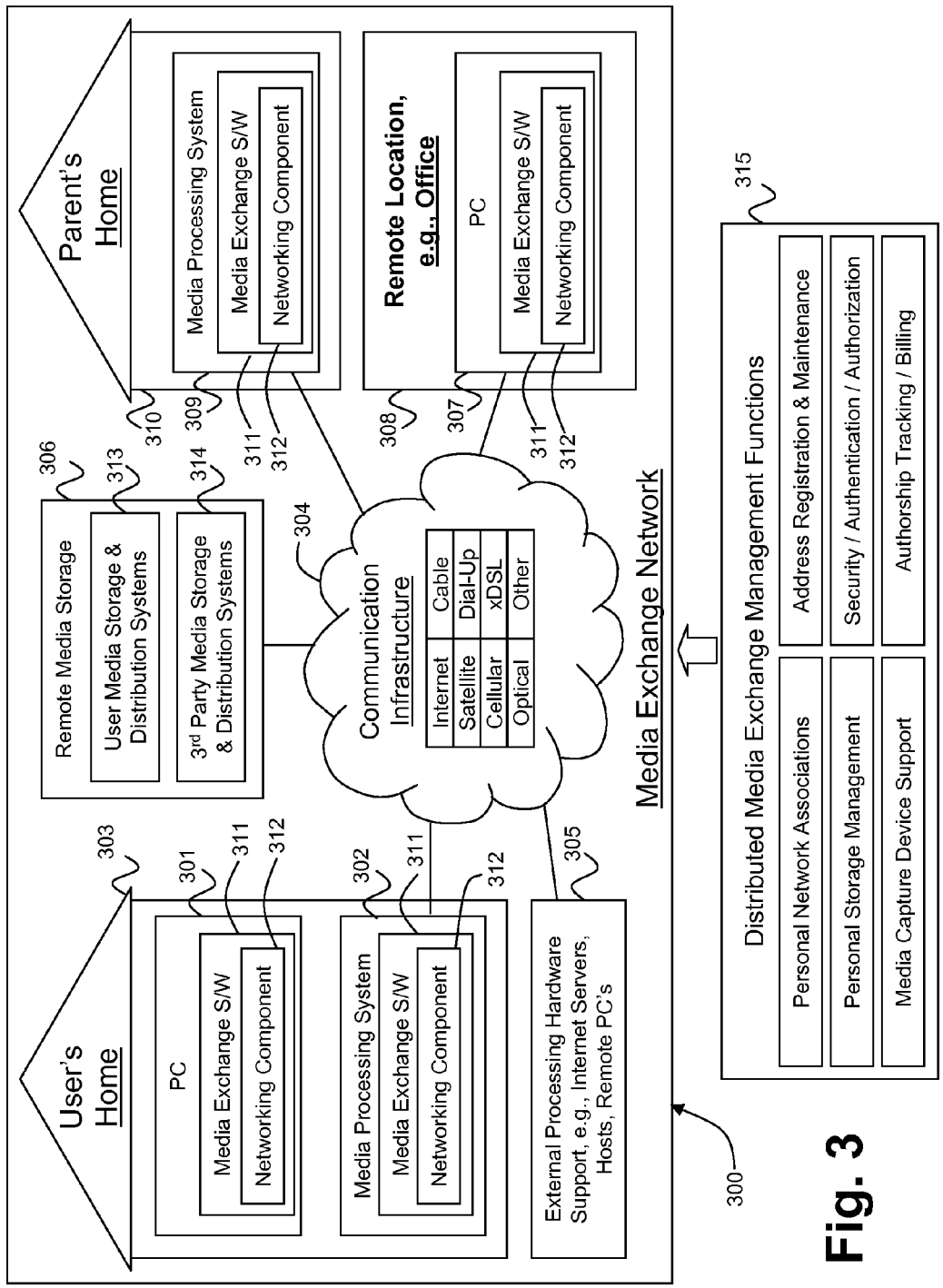
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
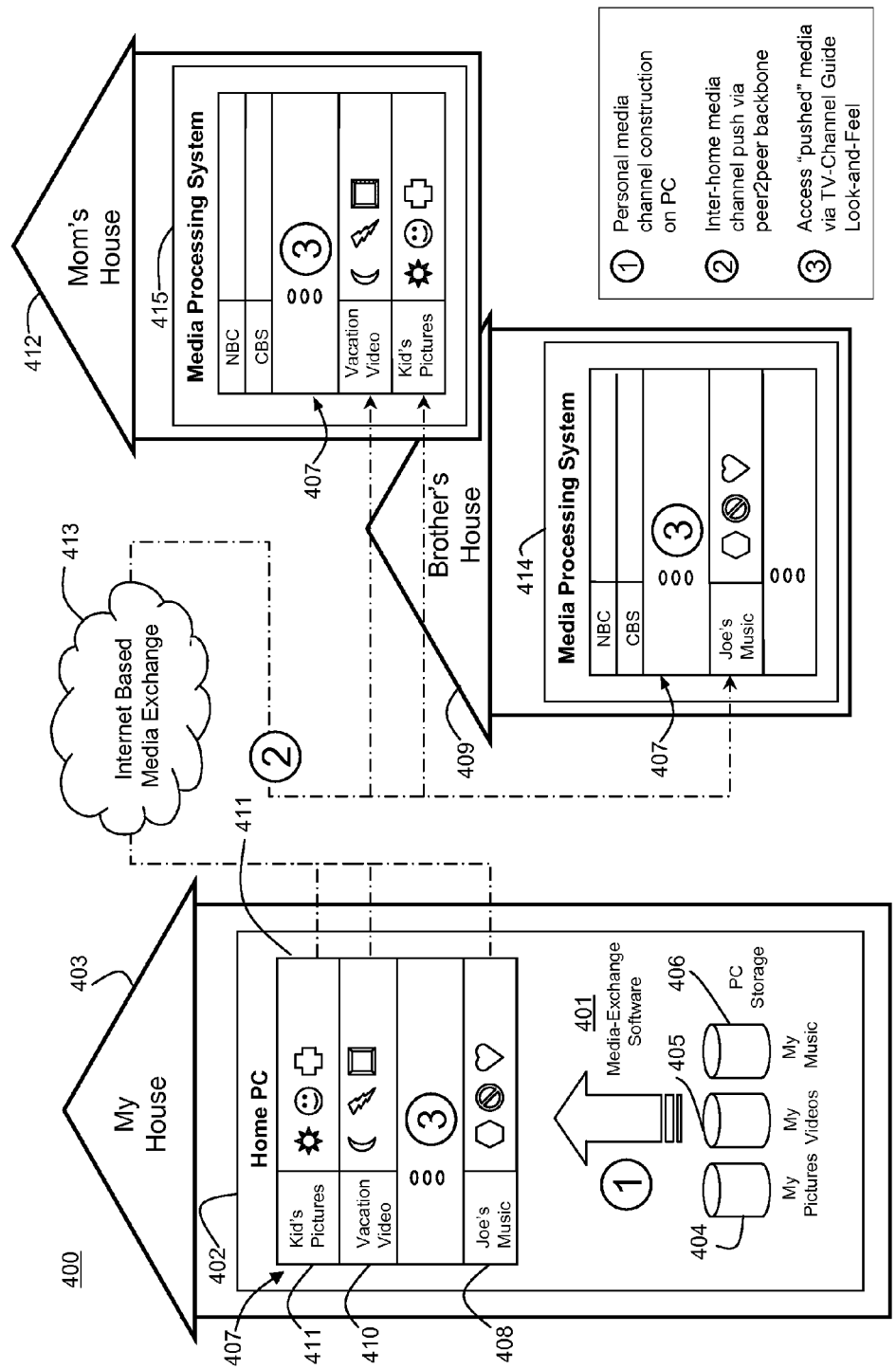
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
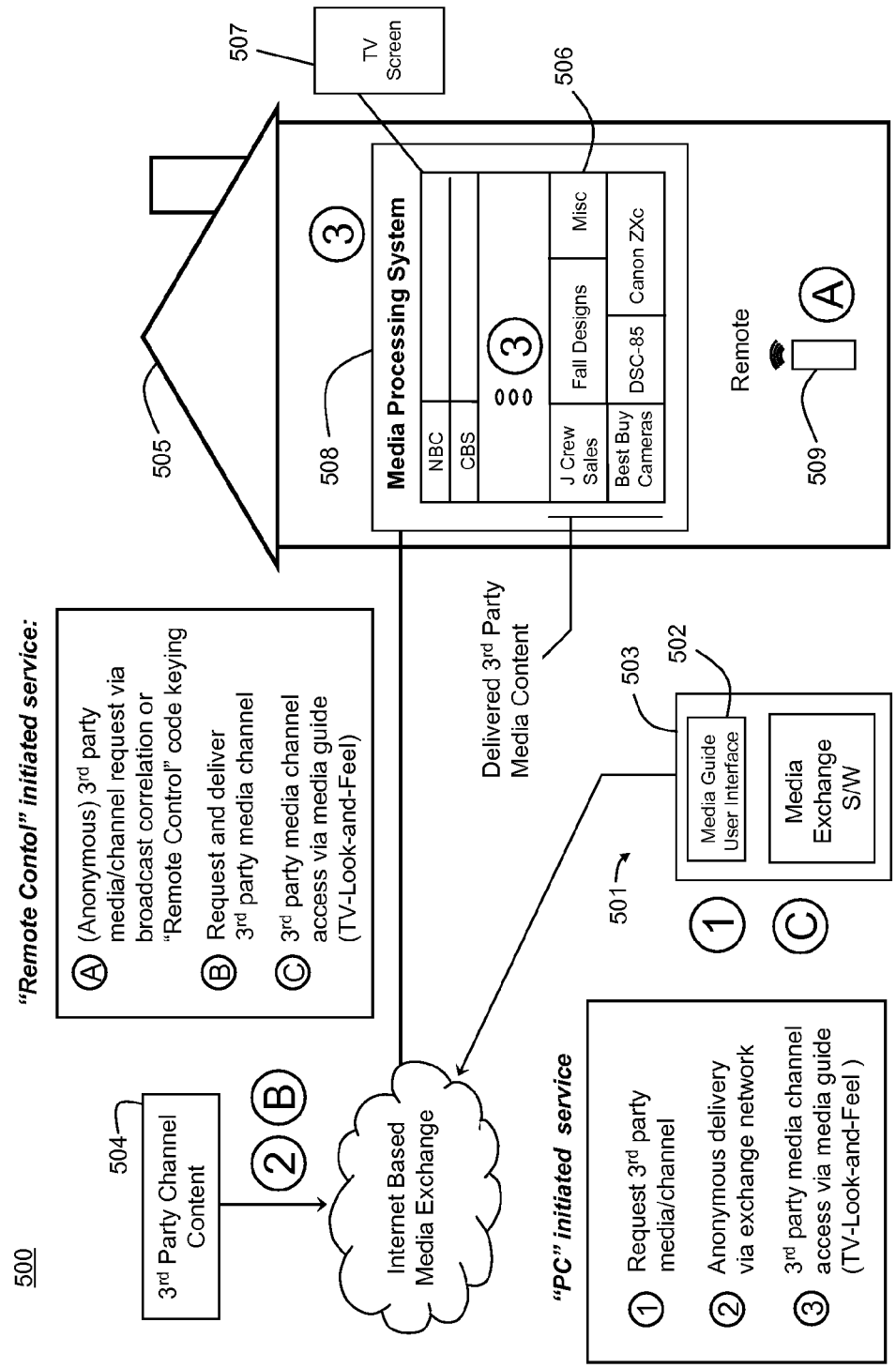
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
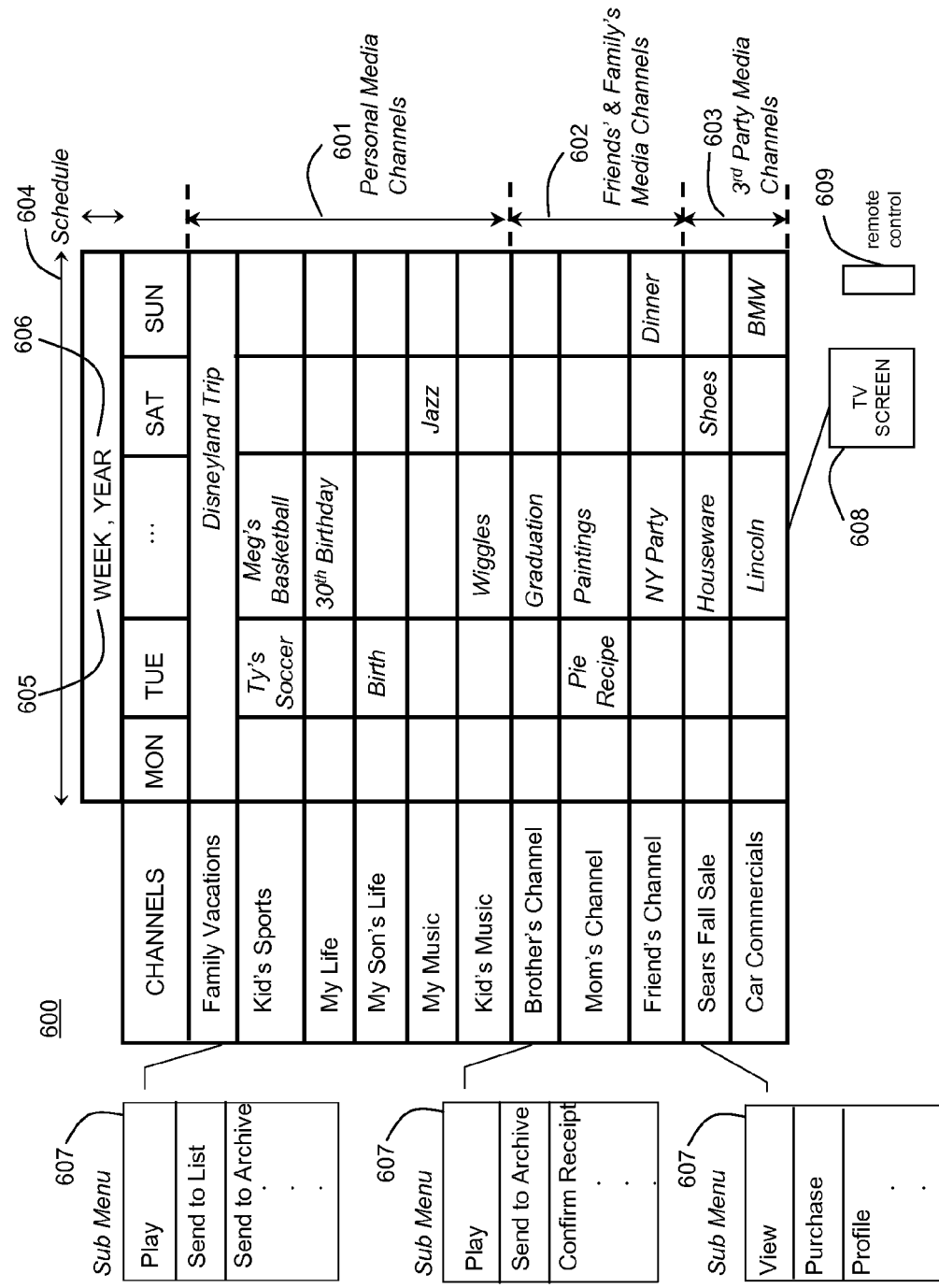
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
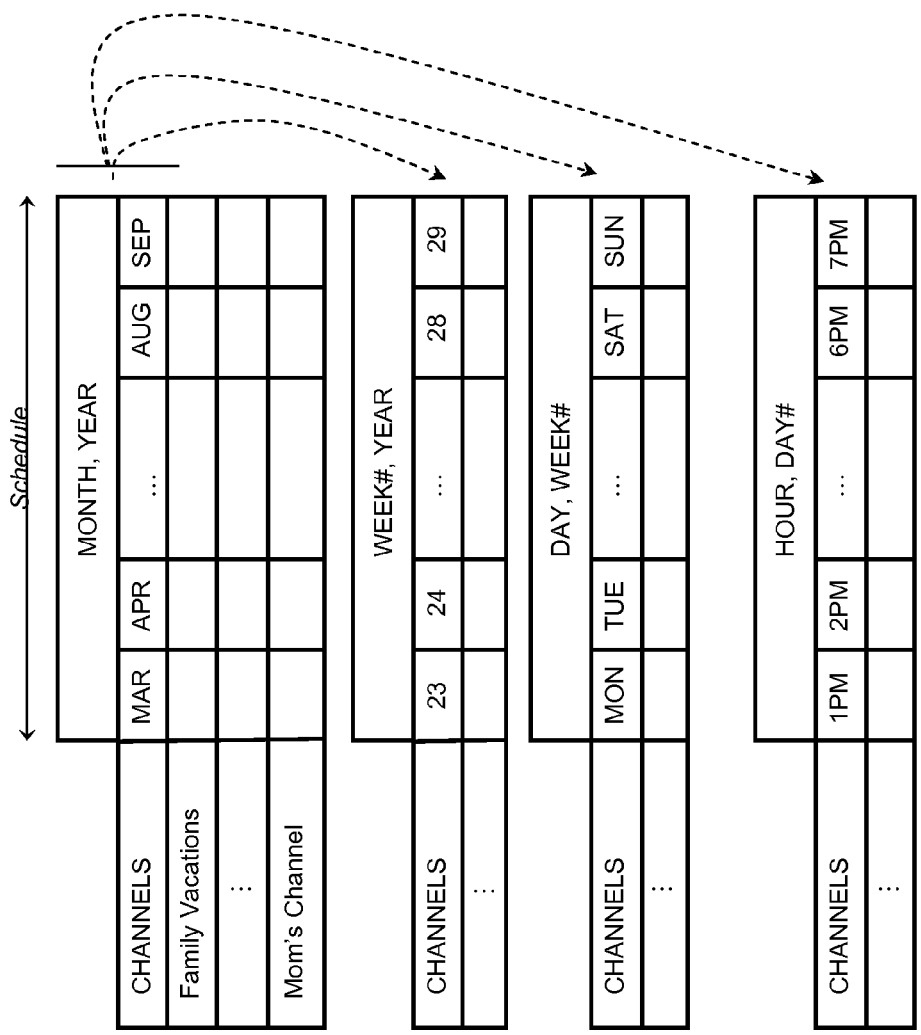
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
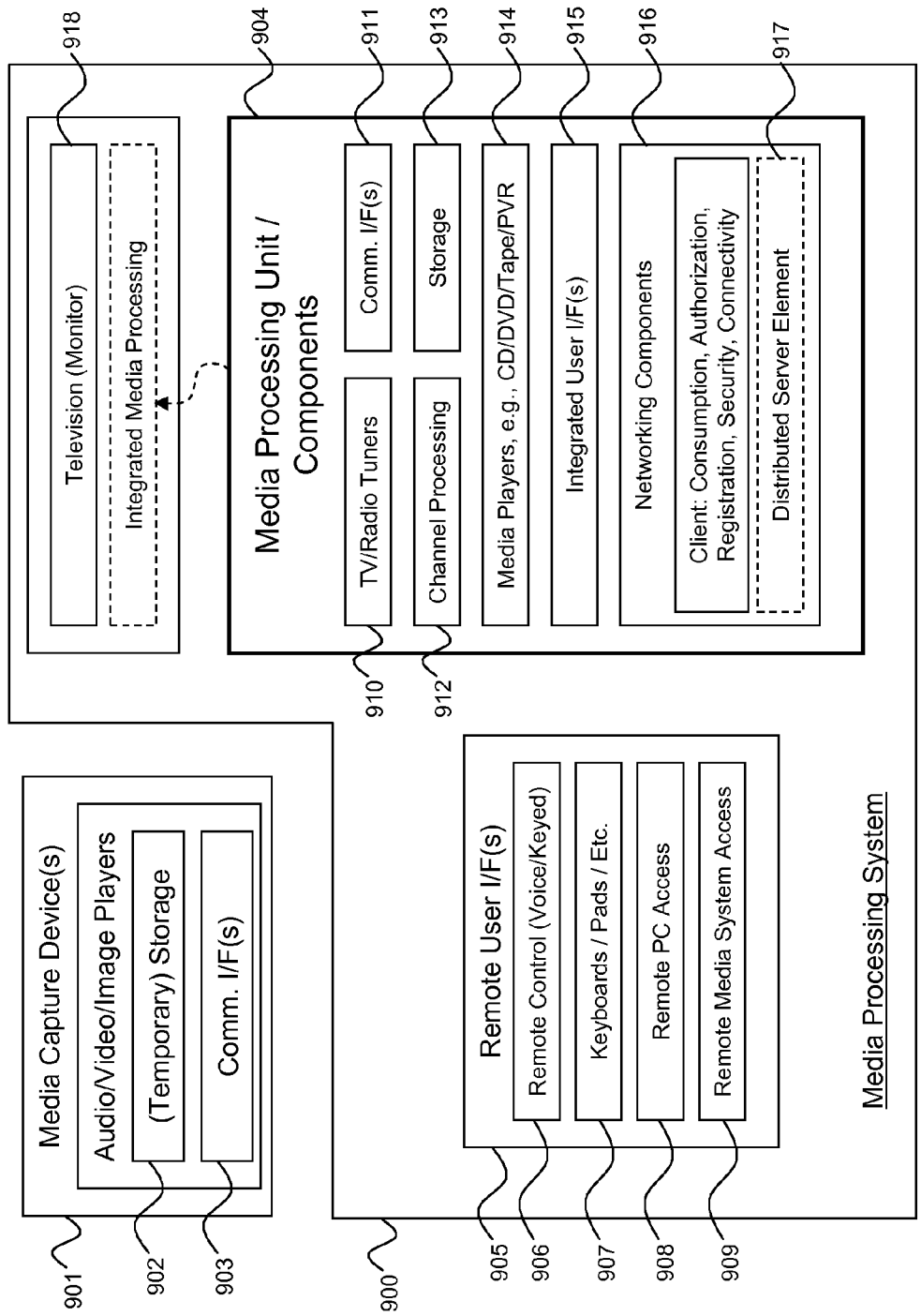
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
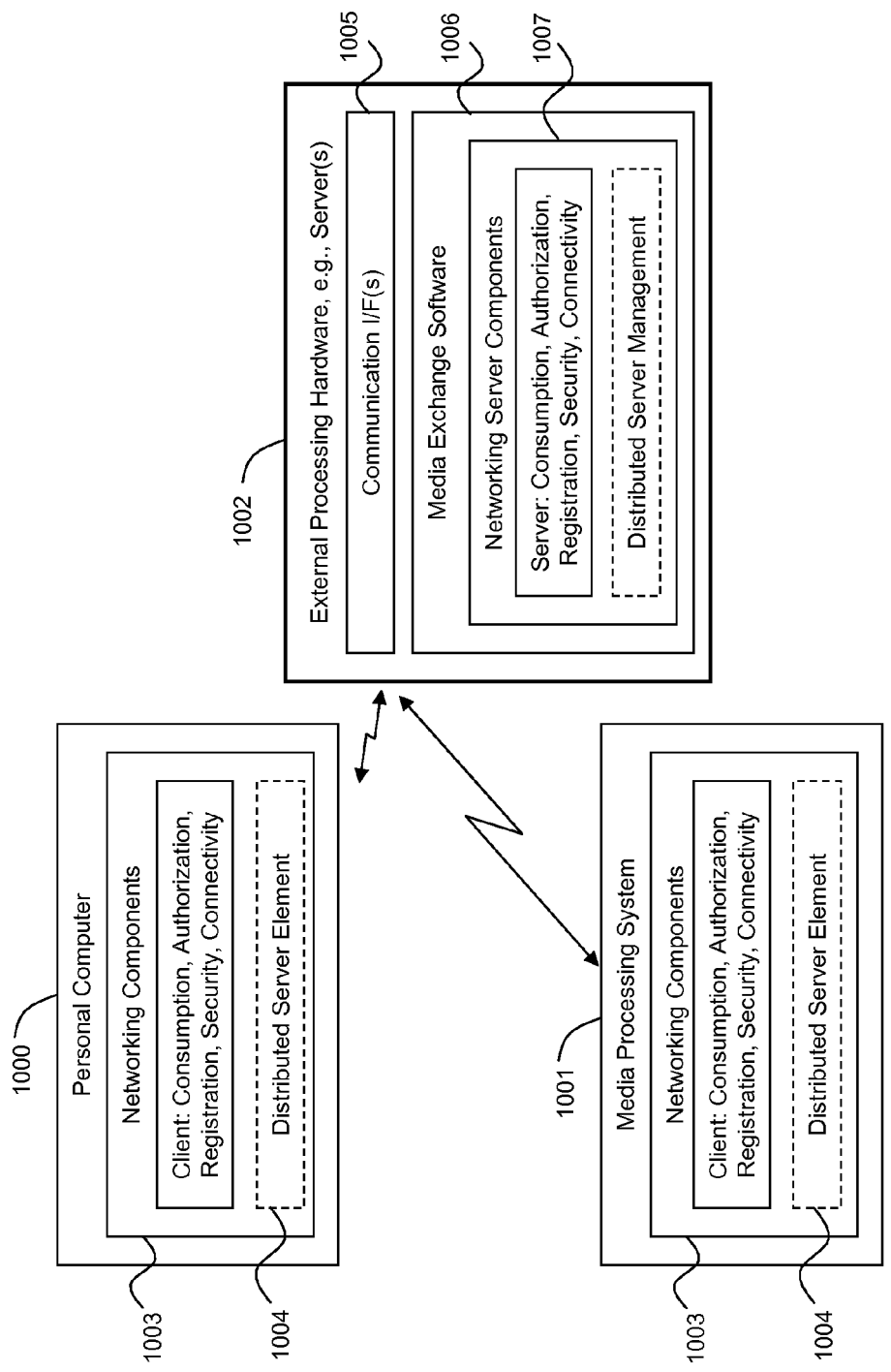
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
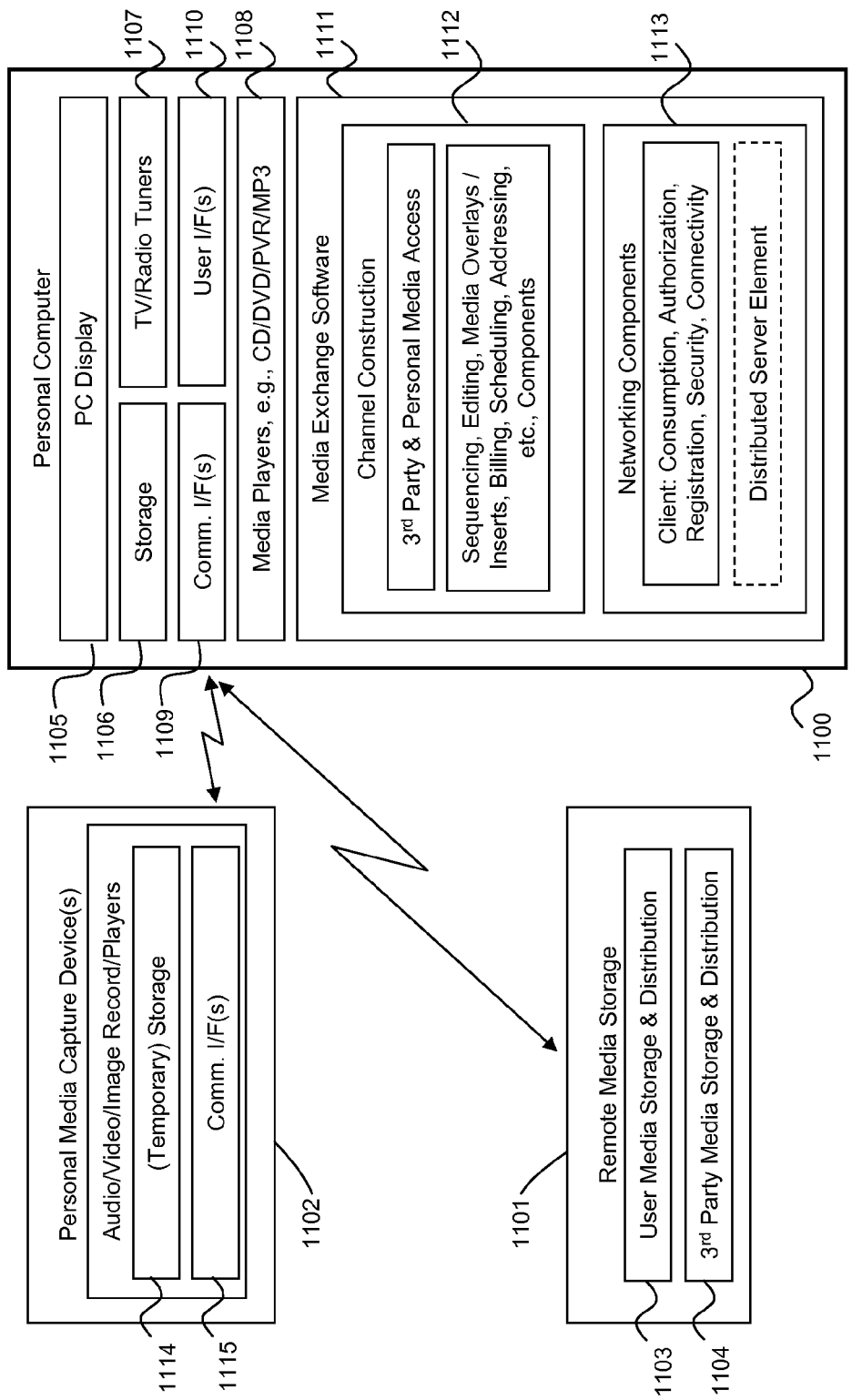
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, the communication of information in a distributed media network may include detecting availability of new media, data and/or service and migrating the newly available media, data and/or service to at least a first media processing system within the distributed media network. The migrated media, data and/or service may be stored in at least a first media processing system. If the stored media, data and/or service is to be processed, then the media, data and/or service may be migrated to a media view and/or a channel view associated with a media processing system. If the newly available migrated media, data and/or service is to be pushed, then the migrated media, data and/or service may be pushed to a second media processing system and/or a personal computer coupled to the media exchange network.

At least one processor may be provided for detecting availability of new media, data and/or service within the distributed network. The processor may be configured to migrate and store the newly available media, data and/or service to a first media processing system within the distributed media network. If the stored media, data and/or service is to be processed, then the processor may migrate the media, data and/or service to a media view and/or a channel view associated with the media processing system. Additionally, in instances where the newly available migrated media, data and/or service is to be pushed, the processor may push the media, data and/or service to a second media processing system and/or a personal computer coupled to the media exchange network. The processor may operate in an automatic and/or manual manner when migrating the newly available media, data and/or service to the first and/or second media processing system within the distributed media network. The newly available media, data and/or service may be indicated to the first media processing system and/or the second media processing system within the distributed media network. After migration, the newly available media, data and/or service, may be archived for subsequent retrieval. The processor may be any or a combination of a computer processor, a media peripheral processor, a media exchange system processor, media processing system processor and a storage processor Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a distributed network, the method comprising:

detecting newly available new media that has been stored in a storage device of the distributed media network;

based on detecting the new media, selecting said new media for migration;

migrating said to at least a first media processing system within the distributed media network as migrated media;

storing said migrated at said at least a first media processing system as stored media;

determining to process said stored media; and based on the determination to process said stored media, automatically and without user intervention:
maintaining the stored media in the first media processing system;
accessing one or more rules for scheduling the presentation of the media in a channel view;
determining, based on the rules, a time to place the stored media in the channel view; and
pushing said stored media to the channel view of at least one user;
wherein when it is determined to not process the stored media by the first media processing system, the stored media is transmitted to an archiving storage device for archival storage of the stored media without pushing the stored media to the channel view.

2. The method according to claim 1, comprising determining whether to push said stored media to a second media processing system and/or a personal computer coupled to the media exchange network.

3. The method according to claim 2, comprising if said stored media is to be pushed, migrating said stored media to said one or both of said second media processing system and/or a personal computer coupled to the media exchange network.

4. The method according to claim 1, comprising scheduling said migration of said stored media to a second media processing system within the distributed media network.

5. The method according to claim 4, comprising indicating said migration of said stored media to the second media processing system within the distributed media network.

6. A machine-readable storage having stored thereon, a computer program having at least one code section for communicating information in a distributed media network, the at least one code section being executable by a machine for causing the machine to perform steps comprising:
detecting new media that has been stored in a storage device of the distributed network;
based on detecting the new media, selecting said new media for migration;
migrating said to at least a first media processing system within the distributed media network as migrated media;
storing said migrated at said at least a first media processing system as stored media;
determining to process said stored media; and
based on the determination to process said stored media, automatically and without user intervention:
maintaining the stored media in the first media processing system;
accessing one or more rules for scheduling the presentation of the media in a channel view;
determining, based on the rules, a time to place the stored media in the channel view; and
pushing said stored media to the channel view of at least one user;
wherein when it is determined to not process the stored media by the first media processing system, the media is transmitted to an archiving storage device for archival storage of the stored media without pushing the stored media to the channel view.

7. The machine-readable storage according to claim claim 6, comprising code for determining whether to push said stored media to a second media processing system and/or a personal computer coupled to the media exchange network.

8. The machine-readable storage according to claim 7, comprising code for migrating said stored media to said one or both of said second media processing system and/or a personal computer coupled to the media exchange network, if said stored media is to be pushed.

9. The machine-readable storage according to claim 6, comprising code for scheduling said migration of said stored media to a second media processing system within the distributed media network.

10. The machine-readable storage according to claim 9, comprising code for indicating said migration of said stored media to the second media processing system within the distributed media network.

11. A system for communicating information in a distributed media network, the system comprising:
at least one processor that is operable to:
detect new media that has been stored in a storage device of the distributed network;
based on detecting the new media, select said new media for migration;
migrate said new media to at least a first media processing system within the distributed network as migrated media;
a local storage operable to store said migrated at said at least a first media processing system as stored media;
said at least one processor is operable to:
determine to process said stored media; and
based on the determination to process said stored media, automatically and without user intervention:
maintain the stored media in the first media processing system;
access one or more rules for scheduling the presentation of the media in a channel view;
determine, based on the rules, a time to place the stored media in the channel view; and
push said stored media to the channel view of at least one user;
wherein when it is determined to not process the stored media by the first media processing system, the media is transmitted to an archiving storage device for archival storage of the stored media without pushing the stored media to the channel view.

12. The system according to claim 11, wherein said at least one processor is operable to determine whether to push said stored media to one or both of a second media processing system and/or a personal computer coupled to the media exchange network.

13. The system according to claim 12, wherein said at least one processor is operable to migrate said stored media to said one or both of said second media processing system and/or a personal computer coupled to the media exchange network, if said stored media is to be pushed.

14. The system according to claim 11, wherein said at least one processor is operable to schedule said migration of said stored to a second media processing system within the distributed media network.

15. The system according to claim 14, wherein said at least one processor is operable to indicate said migration of said stored media to the second media processing system within the distributed media network.

16. The system according to claim 11, wherein said at least one processor is one or more of a computer processor, media peripheral processor, a media exchange system processor, media processing system processor and/or a storage processor.

17. A system for communicating information in a distributed media network, the system comprising:

at least one processor that is operable to:

detecting new media that has been stored in a storage device of the distributed network;

based on detecting the new media, selecting said new media for migration;

migrate said to at least a first media processing system within the distributed media network as migrated media;

cause storage of said stored media in a local storage associated with said at least a first media processing system as stored media;

determine to process said stored media; and based on the determination to process said stored media, automatically and without user intervention:

maintain the stored media in the first media processing system;

access one or more rules for scheduling the presentation of the media in a channel view;

determine, based on the rules, a time to place the stored media in the channel view; and push said stored media to the channel view of at least one user;

wherein when it is determined to not process the stored media by the first media processing system, the media is transmitted to an archiving storage device for archival storage of the stored media without pushing the stored media to the channel view.

18. The system according to claim 17, wherein said at least one processor is operable to determine whether to push said stored media to one or both of a second media processing system and/or a personal computer coupled to the media exchange network.

19. The system according to claim 18, wherein said at least one processor is operable to migrate said stored media to said one or both of said second media processing system and/or a personal computer coupled to the media exchange network, if said stored media is to be pushed.

20. The system according to claim 17, wherein said at least one processor is operable to schedule said migration of said stored media to a second media processing system within the distributed media network.

21. The system according to claim 20, wherein said at least one processor is operable to indicate said migration of said stored media to the second media processing system within the distributed media network.

22. The system according to claim 17, wherein said at least one processor is one or more of a computer processor, media peripheral processor, a media exchange system processor, media processing system processor and/or a storage processor.

* * * * *

UNITED STATES PATENT AND TRADEMARK OFFICE
CERTIFICATE OF CORRECTION

PATENT NO.         : 8,799,366 B2                                          Page 1 of 1
APPLICATION NO.    : 10/675654
DATED              : August 5, 2014
INVENTOR(S)        : Karaoguz et al.

It is certified that error appears in the above-identified patent and that said Letters Patent is hereby corrected as shown below:

In the Claims

Col. 15, line 5, in claim 1: after "migrating said" insert --new media--
Col. 15, line 7, in claim 1: after "said migrated" insert --new media--
Col. 15, line 52, in claim 6: after "said migrated" insert --new media--
Col. 16, line 31, in claim 11: after "said migrated" insert --new media--
Col. 16, line 62, in claim 14: after "stored" insert --media--
Col. 17, line 13, in claim 17: after "migrate said" insert --new media--

Signed and Sealed this
Eighth Day of September, 2015

Michelle K. Lee
*Director of the United States Patent and Trademark Office*